United States Patent
Reeves et al.

(10) Patent No.: US 9,060,297 B1
(45) Date of Patent: Jun. 16, 2015

(54) APPLICATION LABELS FOR DATA COMMUNICATION

(71) Applicant: Sprint Communications Company L.P., Overland Park, KS (US)

(72) Inventors: Raymond Emilio Reeves, Oviedo, FL (US); Mark Douglas Peden, Olathe, KS (US); Simon Youngs, Overland Park, KS (US); Gary Duane Koller, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 78 days.

(21) Appl. No.: 13/827,865

(22) Filed: Mar. 14, 2013

(51) Int. Cl.
H04W 28/02 (2009.01)

(52) U.S. Cl.
CPC .......... *H04W 28/0289* (2013.01); *H04W 28/02* (2013.01)

(58) Field of Classification Search
CPC .......... H04W 4/00; H04W 8/00; H04W 8/02; H04W 8/08; H04W 8/18; H04W 8/22; H04W 28/02; H04W 28/0215; H04L 12/56; H04L 12/54; H04L 12/5689; H04L 29/0653; H04L 29/06102
USPC .............. 370/310, 310.2, 313, 328, 330, 252, 370/389
See application file for complete search history.

(56) References Cited

U.S. PATENT DOCUMENTS

| | | | |
|---|---|---|---|
| 7,436,834 B1 * | 10/2008 | Zhang et al. | 370/389 |
| 7,970,930 B2 | 6/2011 | Dobbins et al. | |
| 2002/0196785 A1 * | 12/2002 | Connor | 370/392 |
| 2006/0072538 A1 * | 4/2006 | Raith | 370/349 |
| 2007/0047564 A1 * | 3/2007 | Kato | 370/412 |
| 2007/0060166 A1 * | 3/2007 | Kitamura et al. | 455/450 |
| 2009/0175259 A1 * | 7/2009 | Lucky | 370/349 |
| 2011/0305215 A1 * | 12/2011 | Hofmann et al. | 370/329 |
| 2012/0072592 A1 | 3/2012 | Lidstrom et al. | |
| 2013/0044603 A1 * | 2/2013 | Macias et al. | 370/241 |

* cited by examiner

*Primary Examiner* — Anh Ngoc Nguyen

(57) ABSTRACT

Embodiments disclosed herein provide systems, methods, and software for providing an application label in a level two communication. In a particular embodiment, a wireless communication device provides a processing system configured to execute an application that requires application data to be communicated with a communication network. The wireless communication device further provides a layer two communication transceiver configured to label the application in a layer two communication header, and communicate to the communication network at least the layer two communication header and the application data.

20 Claims, 5 Drawing Sheets

APPLICATION LABELS FOR DATA COMMUNICATION

TECHNICAL BACKGROUND

Many modern wireless communication devices are capable of executing a variety of different applications that communicate using a communication system. Typically, these communications are formed in layers where, in the case of wireless devices, layer one may be air or space as the communication transport media. Layer two may employ a variety of different communication formats, including Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Layer three may be Internet Protocol or some other network layer. And, layer four may be the application data itself.

Some of the applications on the wireless communication device use more data than others and are more taxing on portions of the communication system. As a result, when more devices join the communication system, the communication system may see an increase in congestion. Thus, there is a need to efficiently monitor the applications that are using the communication system.

Overview

Embodiments disclosed herein provide systems, methods, and software for providing an application label in a level two communication. In a particular embodiment, a wireless communication device provides a processing system configured to execute an application that requires application data to be communicated with a communication network. The wireless communication device further provides a layer two communication transceiver configured to label the application in a layer two communication header, and communicate to the communication network at least the layer two communication header and the application data.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
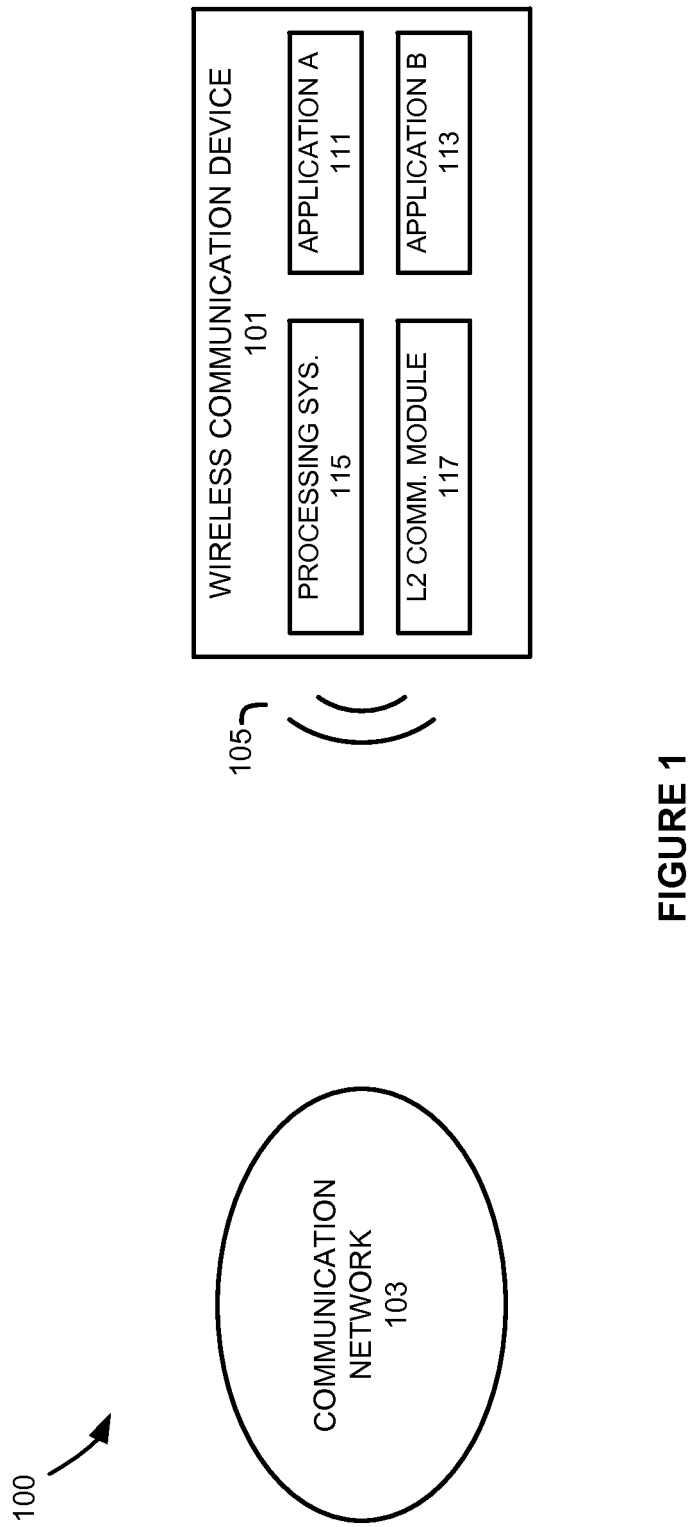
FIG. 1 illustrates a wireless communication system.

FIG. 1 illustrates a wireless communication system 100 for including application labels in data communications. Wireless communication system 100 includes communication network 103 and wireless communication device 101. Wireless communication device 101 further includes application A 111, application B 113, processing system 115, and level two communication module 117. Wireless communication device 101 and communication network 103 communicate over wireless link 105.

In operation, wireless communication device 101 communicates with other wireless devices, application service systems, the Internet, and other types of communication systems via communication network 103. Communication network 103 can allow applications on wireless communication device 101 to communicate application data with the Internet and other services.

Figure 2:
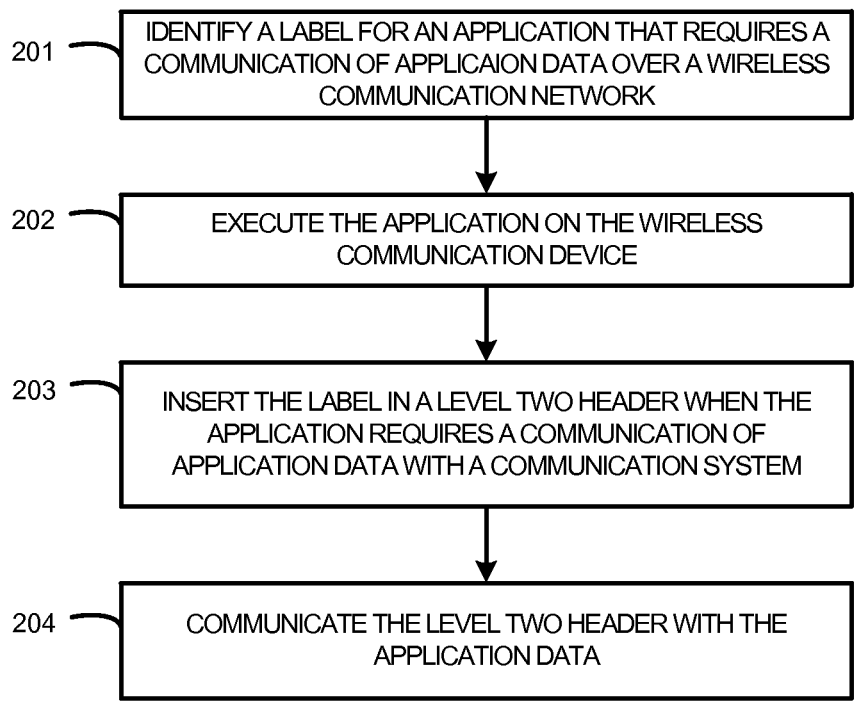
FIG. 2 illustrates a method for operating a wireless communication device.

FIG. 2 illustrates the operation of wireless communication device 101 according to an example. The operation initially identifies a label for an application that requires the communication of application data over communication network 103 (step 201). This application could include a video streaming application, a music streaming application, a peer-to-peer (P2P) application, a weather application, or any other type of application. In some examples, the identification of the label could occur when the application is installed on wireless communication device 101. In other examples, the identification of the label could occur the first time or any other subsequent time that the application is executed on wireless communication device 101. In still other examples, the identification of the label could occur when the application requires a data communication with communication network 103.

The application label, in some examples, could be different for each version of the application. Thus, when an application updates on wireless communication device 101, the label will change accordingly. The label can be assigned to the application by level two communication module 117, processing system 115, or some other module located on wireless communication device 101. After being assigned, the label can then be stored with the rest of the application data, such as with example application A and example application B.

Application A and application B can be executed by processing system 115 (step 202). During this execution, application A and/or application B may require a data communication with communication network 103. For example, if application A is a weather application, there may be a need to update the local forecast for the user of wireless communication device 101. When such a data communication is needed, level two communication module 117 can place the application label in a level two communication header (step 203). A level two communication may employ a variety of different communication formats, including Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

In at least one example, to receive the application label and place the label in the header, processing system 115 or a level three communication module on wireless communication device 101 may pass the label or some other application identifier (such as a URL) to level two communication module 117. Alternatively, level two communication module 117 may query processing system 115 or the level three communication module for the label or other application identifier. In examples where level two communication module 117 is passed an application identifier other than the label, level two communication module 117 may employ a look up table to find the appropriate application label.

The level two communication header, which includes the application label, may then be transferred with the application data to communication network 103 (step 204). The application label may be used by equipment on communication network 103 to determine the appropriate action with the application data. Examples of appropriate actions include completing the requests of the application, denying the requests of the application, forwarding the requests of the application to an interested third party, or any other action based on the application label—including combinations thereof.

Referring back to FIG. 1, wireless communication device 101 comprises Radio Frequency (RF) communication circuitry and an antenna in addition to the items illustrated in FIG. 1. The RF communication circuitry typically includes an amplifier, filter, modulator, and signal processing circuitry. In some examples, the RF communication circuitry may be implemented with level two communication module 117. Wireless communication device 101 may also include a user interface, memory device, other software (including an operating system), or some other communication components. Wireless communication device 101 may be a telephone, computer, e-book, mobile Internet appliance, wireless network interface card, media player, game console, or some other wireless communication apparatus.

Communication network 103 comprises network elements that provide communications services to wireless device 101. Communication network 103 may comprise switches, wireless access nodes, Internet routers, network gateways, application servers, computer systems, communication links, or some other type of communication equipment—including combinations thereof.

Wireless sector 105 includes wireless links that use the air or space as the transport media. The wireless links may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

Additionally, although two applications are illustrated on wireless communication device 101 for simplicity, it should be understood that wireless communication device 101 could process any number of applications.

Figure 3:
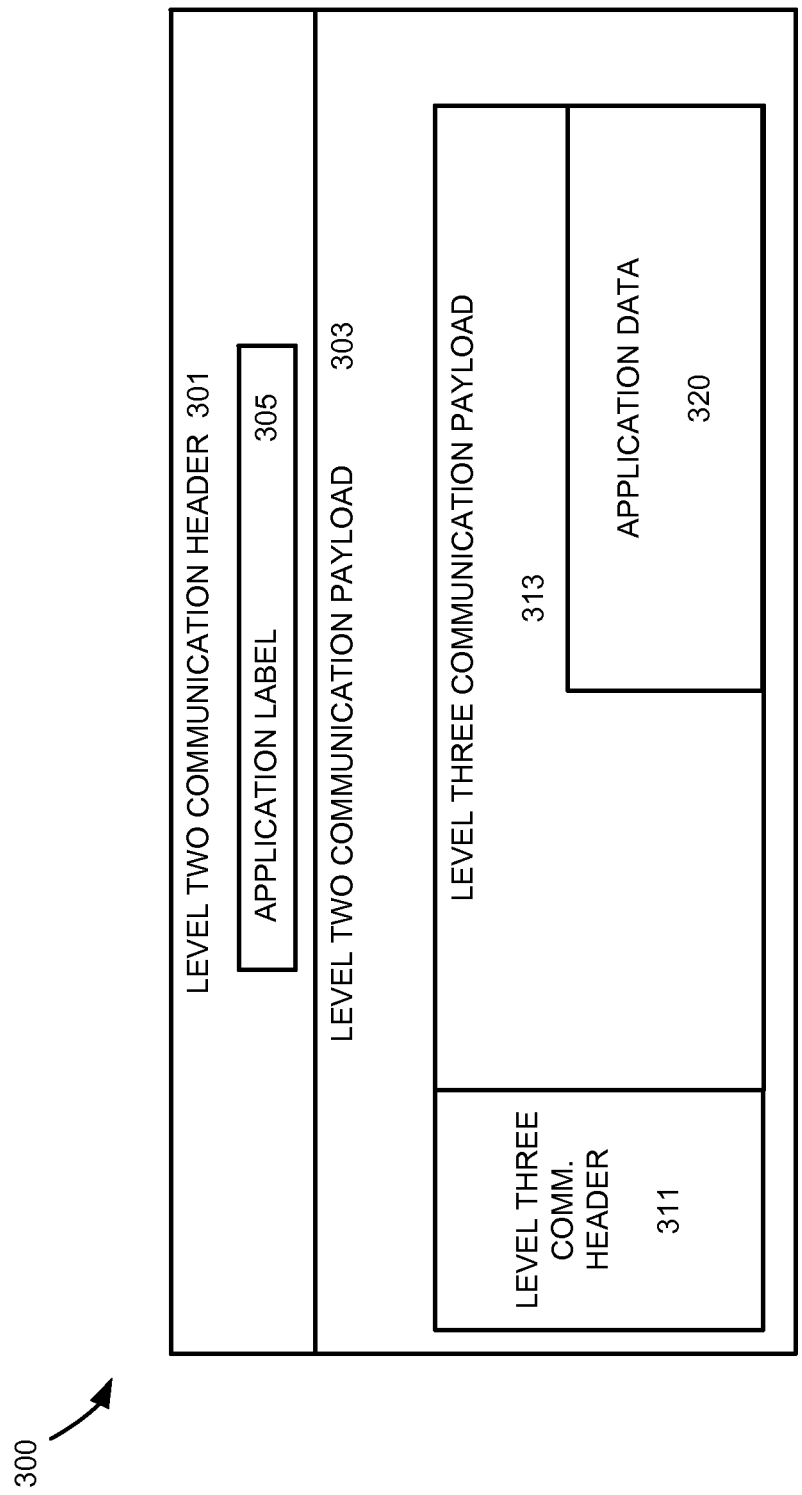
FIG. 3 illustrates an overview of a level two communication.

FIG. 3 illustrates a level two communication 300 from a wireless communication device according to one example. FIG. 3 includes level two communication header 301, level two communication payload 303, application label 305, level three communication header 311, level three communication payload 313, and application data 320.

In operation, a wireless communication device will execute applications that require communication with a communication network. In such instances, application data 320 that needs the communication will pass through a level three communication module. Such a module may be implemented using the main processing system for the wireless device or may be implemented using a separate processing system on the device. As application data 320 passes through the level three communication module, the application data will be formatted into level three communication header 311 and level three communication payload 313. This level three format may prepare the application data for Internet Protocol (IP) or some other similar communication format.

Following the level three formatting, the level three communication comprising header 311 and payload 313 are passed to a level two communication module. The level two communication module can be a separate processing system on the wireless communication device, or may be implemented on the main processing system of the wireless communication device. As the level three formatted communication passes through the level two communication module, it is formatted into level two communication header 301 and level two communication payload 303. The combination of header 301 and payload 303 prepares application data 320 to be communicated using Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

Within level two communication header 301, the level two communication module will include application label 305. Application label 305 can be created when the application is installed, can be created when the application is executed, can be created when the application requires a communication over a communication network, or can be created at any other instance. In some examples, the application label will be saved with the application data on the wireless communication device. Thus, when the application needs to use the communication network, the level two communication module will insert the predetermined label that is saved with the application. Although application label 305 is illustrated in level two communication header 301, application label 305 may be included in level two communication payload 303 in some circumstances.

Application label 315 may be defined externally and transferred to the device using a communication network, may be defined during the production of the wireless device, or may be defined by any other method—including combinations thereof.

In at least one example, application label 305 can be a number that is associated with the importance of the communication. For example, a weather application may have a number with a higher priority than a P2P application. Thus, when the communication network becomes busy, only the applications with the higher priority will be allowed on the communication network.

In another example, an administrator may prefer that some applications be banned from the communication network. In these situations, any communication from a wireless device containing the forbidden application label can be dismissed or forwarded to the appropriate administrator.

Figure 4:
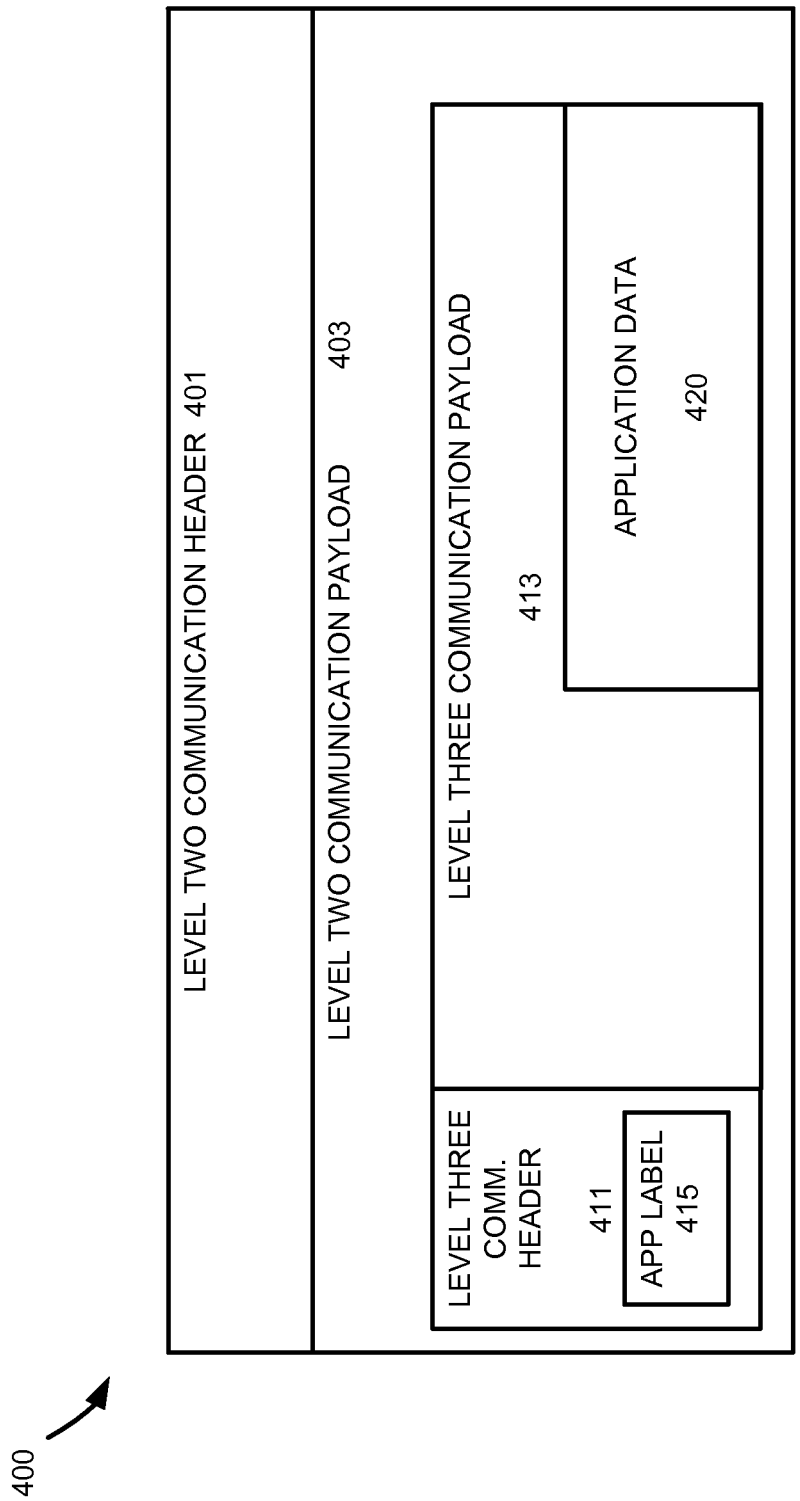
FIG. 4 illustrates an overview of a level two communication.

FIG. 4 illustrates a level two communication 400 from a wireless communication device according to an alternative example. FIG. 4 includes level two communication header 401, level two communication payload 403, level three communication header 411, level three communication payload 413, application label 415, and application data 420.

In operation, a wireless communication device will execute applications that require communication with the Internet or some other service. In such instances, application data 420 that needs the communication will pass through a level three communication module. Such a module may be implemented using the main processing system for the device or may be implemented using a separate processing system on the device. As application data 420 passes through the level three communication module, application data 420 will be formatted into level three communication header 411 and level three communication payload 413. This level three format will prepare the application data for Internet Protocol (IP) or some other similar communication format.

While creating the level three format, the level three module will also prepare application label 415 to be included in level three communication header 411. Application label 415 may be determined when the application is installed, may be determined when the application is first executed, may be determined every instance the application is executed, may be determined when the application needs to communicate using a communication network, or may be determined at any other instance. In some examples, the application label will be saved with the application data on the wireless communication device. Thus, when the application needs to use the communication network, the level three communication module will insert the predetermined label that is saved with the application.

Application label 415 may be defined externally and transferred to the device using a communication network, may be defined during the production of the wireless device, or may be defined by any other method—including combinations thereof.

In at least one example, application label 415 can be a number that is associated with the importance of the communication. For example, a weather application may have a number with a higher priority than a P2P application. Thus, when the communication network becomes busy, only the applications with the higher priority will be allowed on the communication network.

In another example, an administrator may prefer that some applications be banned from a communication network. In these situations, any communication from a wireless device containing the forbidden application label can be dismissed or forwarded to the appropriate administrator.

Following the processing with the level three communication module, header 411 and payload 413 are passed to the level two communication module. At the level two communication module header 411 (including application label 415) and payload 413 are reformatted into a level two communication format which includes level two communication header 401 and level two communication payload 403. This level two communication format may include Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Once in the level two communication format, the application data is then capable of communication with a communication network.

Figure 5:
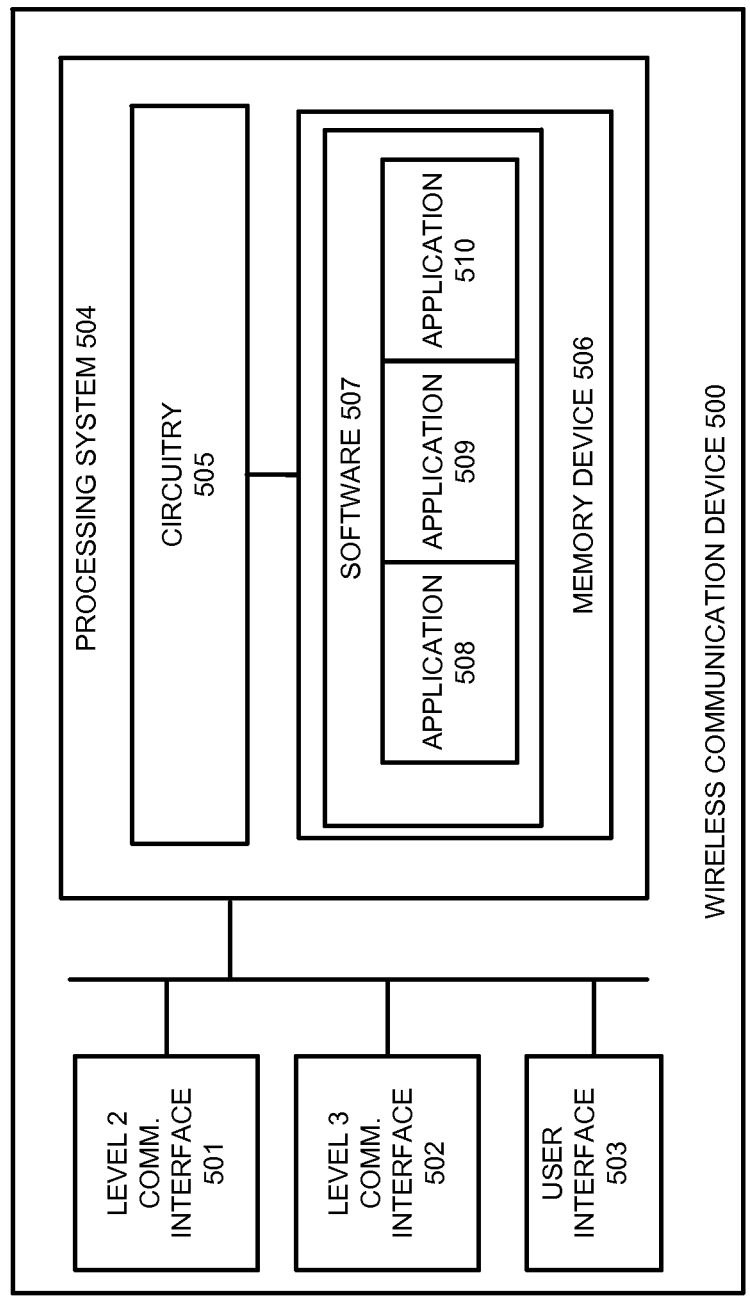
FIG. 5 illustrates a wireless communication device.

FIG. 5 illustrates a wireless communication device 500 according to one example. Wireless communication device 500 is an example of wireless communication device 101, although device 101 could use alternative configurations. Wireless communication device 500 comprises level two communication interface 501, level three communication interface 502, user interface 503, and processing system 504. Processing system 504 is linked to level two communication interface 501, level three communication interface 502, and user interface 503. Processing system 504 includes processing circuitry 505 and memory device 506 that stores operating software 507. Wireless communication device 500 may include other well-known components such as a battery and enclosure that are not shown for clarity. Wireless communication device 500 may be a telephone, computer, e-book, mobile Internet appliance, media player, game console, wireless network interface card, or some other wireless communication apparatus—including combinations thereof.

Level two communication interface 501 may further be connected with RF communication circuitry and an antenna. The RF communication circuitry typically includes an amplifier, filter, RF modulator, and signal processing circuitry. Level two communication interface 501 may also include a memory device, software, processing circuitry, or some other communication device. Level two communication interface 501 may use various protocols, such as CDMA, EVDO, WIMAX, GSM, LTE, WIFI, HSPA, or some other wireless communication format.

Level three communication interface 502 may include a memory device, software, processing circuitry, or some other device configured to format communications in IP format or some other similar format. Although illustrated separately in the present example, it should be understood that level three communication interface 502 may be implemented in processing system 504, level two communication interface 501, or other circuitry on wireless communication device 500.

User interface 503 comprises components that interact with a user to receive user inputs and to present media and/or information. User interface 503 may include a speaker, microphone, buttons, lights, display screen, touch screen, touch pad, scroll wheel, communication port, or some other user input/output apparatus—including combinations thereof. User interface 503 may omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Processing circuitry 505 is typically mounted on a circuit board that may also hold memory device 506 and portions of communication interfaces 501-502 and user interface 503. Operating software 507 comprises computer programs, firmware, or some other form of machine-readable processing instructions. Operating software 507 includes applications 508-510. Operating software 507 may further include an operating system, utilities, drivers, network interfaces, applications, or some other type of software. When executed by processing circuitry 505, operating software 507 operates in wireless communication device 600 as described herein.

In a particular example, when applications 508-510 are installed on wireless communication device 500, a label will be associated with each of the applications. Such a label may then be stored with applications 508-510 on wireless communication device 500. When one of the applications is executed by processing system 504, the executed application may require a communication with a communication network. In such situations, the application data will be prepared in IP format or some other similar format of communication in level three communication interface 502. Following the formatting in level three communication interface 502, the application data will be prepared for wireless communication at level two communication interface 501. During the preparation in level two communication interface 501, the application label will be placed in the level two communication header. Finally, the formatted level two communication, containing the application data and application label, will be communicated to the communication network.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication device, comprising:
   a processing system configured to execute an application that requires application data to be communicated with a communication network; and
   a layer two communication interface configured to:
   insert an application label identifying the application in a layer two communication header; and
   communicate to the communication network at least the layer two communication header and the application data.

2. The wireless communication device of claim 1 wherein the layer two communication interface communicates in a layer two communication format.

3. The wireless communication device of claim 2 wherein the layer two communication format comprises a LTE communication format.

4. The wireless communication device of claim 2 wherein the layer two communication format comprises a CDMA communication format.

5. The wireless communication device of claim 2 wherein the layer two communication format comprises a HSPA communication format.

6. The wireless communication device of claim 1 wherein the processing system is further configured to identify the application label upon installation of the application on the wireless communication device.

7. The wireless communication device of claim 1 wherein the application label comprises a communication priority label.

8. A non-transitory computer readable medium having program instruction stored thereon that, when executed by a wireless communication device, direct the wireless communication device to at least:
   execute an application that requires application data to be communicated with a communication network;
   insert an application label identifying the application in a layer two communication header; and
   communicate to the communication network at least the layer two communication header and the application data.

9. The non-transitory computer readable medium of claim 8 wherein the program instruction, to insert an application label for the application in a layer two communication header, directs the wireless communication device to insert an application label for the application in a wireless communication format header.

10. The non-transitory computer readable medium of claim 8 wherein the program instruction, to insert an application label for the application in a layer two communication header, directs the wireless communication device to insert an application label for the application in a LTE communication format header.

11. The non-transitory computer readable medium of claim 8 wherein the program instructions further direct the wireless communication device to identify the application label upon installation of the application.

12. The non-transitory computer readable medium of claim 8 wherein the application label comprises a communication priority label.

13. The non-transitory computer readable medium of claim 8 wherein the application label comprises a forbidden application label.

14. A method of operating a wireless communication device, the method comprising:
   executing an application that requires application data to be communicated with a communication network;
   inserting an application label identifying the application in a layer two communication header; and
   communicating to the communication network at least the layer two communication header and the application data.

15. The method of claim 14 wherein the layer two communication header is a part of a layer two communication format.

16. The method of claim 15 wherein the layer two communication format comprises LTE communication format.

17. The method of claim 15 wherein the layer two communication format comprises CDMA communication format.

18. The method of claim 15 wherein the layer two communication format comprises HSPA communication format.

19. The method of claim 14, further comprising:
   identifying the application label upon installation of the application.

20. The method of claim 14 wherein the application label comprises a communication priority label.

* * * * *